(12) United States Patent
Lutz

(10) Patent No.: US 7,698,829 B2
(45) Date of Patent: Apr. 20, 2010

(54) DEVICE FOR DETERMINING A MEASUREABLE VARIABLE ON A MEASUREMENT OBJECT

(75) Inventor: Hariolf Lutz, Bopfingen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 0 days.

(21) Appl. No.: 12/129,139

(22) Filed: May 29, 2008

(65) Prior Publication Data
US 2009/0013549 A1    Jan. 15, 2009

Related U.S. Application Data

(63) Continuation of application No. PCT/EP2006/011044, filed on Nov. 17, 2006.

(30) Foreign Application Priority Data
Dec. 2, 2005   (DE) .................. 10 2005 058 504

(51) Int. Cl.
G01B 5/004    (2006.01)
(52) U.S. Cl. ......................... 33/503; 33/1 M
(58) Field of Classification Search ............ 33/503, 33/1 M, 568–570, 573
See application file for complete search history.

(56) References Cited

U.S. PATENT DOCUMENTS

| 3,594,908 | A | | 7/1971 | Pagella |
| 4,495,703 | A | | 1/1985 | Sakata et al. |
| 4,594,791 | A | | 6/1986 | Brandstetter |
| 4,727,653 | A | | 3/1988 | Fujitani et al. |
| 4,763,420 | A | * | 8/1988 | McCabe et al. ............... 33/503 |
| 5,257,461 | A | * | 11/1993 | Raleigh et al. ............... 33/503 |
| 5,583,691 | A | * | 12/1996 | Yamane et al. .............. 359/393 |
| 6,083,333 | A | * | 7/2000 | Van Beers et al. .......... 156/73.1 |
| 6,219,931 | B1 | * | 4/2001 | Roth ........................... 33/645 |
| 6,347,458 | B1 | * | 2/2002 | Kaczynski ................... 33/503 |

FOREIGN PATENT DOCUMENTS

| DE | 1 798 191 | 9/1971 |
| DE | 31 18 612 A1 | 5/1982 |
| EP | 0 604 380 B2 | 6/1994 |
| GB | 2 080 954 A | 2/1982 |

OTHER PUBLICATIONS

"Mobile bridge and the stationary worktable"; Nov. 21, 1997; 5 pages.

* cited by examiner

Primary Examiner—G. Bradley Bennett
Assistant Examiner—Tania C Courson
(74) Attorney, Agent, or Firm—Harness, Dickey & Pierce, P.L.C.

(57) ABSTRACT

A device for determining a measureable variable on a measurement object has a baseplate mounted on a plurality of machine feet. A measuring head is arranged on a frame structure. The frame structure can be moved on the baseplate. A workpiece table can be placed over the baseplate in order to support the measurement object. The machine feet may project upward from the baseplate in order to hold the workpiece table with a reduced deformation of the baseplate regardless of the workpiece weight.

20 Claims, 3 Drawing Sheets

DEVICE FOR DETERMINING A MEASUREABLE VARIABLE ON A MEASUREMENT OBJECT

CROSS-REFERENCES TO RELATED APPLICATIONS

This application is a continuation of international patent application PCT/EP2006/011044, filed on Nov. 17, 2006 designating the U.S., which international patent application has been published in German language and claims priority from German patent application DE 10 2005 058 504.3, filed on Dec. 2, 2005. The entire contents of these priority applications are incorporated herein by reference.

BACKGROUND OF THE INVENTION

The present invention relates to a device for determining a measureable variable on a measurement object, and more particularly to a coordinate measuring machine.

Coordinate measuring machines are generally used for determining spatial coordinates of defined measuring points on a measurement object. They allow the determination of geometric dimensions and/or the three-dimensional shape of the measurement object by exploiting a plurality of spatial coordinates. A typical field of use is the measurement of workpieces for quality control. Typically, coordinate measuring machines have a frame structure including a measuring head that can be moved relative to the measurement object. The measuring head is brought into a defined position relative to the measuring point on the measurement object, and the spatial coordinates of the measuring point can then be determined from the spatial position of the measuring head.

It is a known problem with coordinate measuring machines that the workpiece table on which a measurement object is placed for a measurement task can be deformed under the load of the measurement object. When this deformation carries over to the frame structure, measurement results are corrupted in a way that is difficult to correct. There are various proposals for solving this problem.

German patent application DE 31 18 612 A1 proposes a machine design wherein a baseplate rests on a bed by a first plurality of machine feet. Provided in the baseplate are vertical sleeves in which a plurality of second machine feet are arranged and are supported on the bed. The second machine feet can be adjusted in height and bear on their upper, free end a workpiece table on which the measurement object can be placed. Since the frame structure with the moveable measuring head is mounted on the baseplate, deformations of the workpiece table do not act on the frame structure. In other words, the linearity of the guides of the moveable measuring head is largely independent from the weight of the measurement object. However, the known device is relatively complicated in design and installation, since a plurality of machine feet must be mounted and adjusted. Moreover, in this known device there is the risk of the baseplate being displaced together with the frame structure in relation to the tool table, and this can lead to stresses and measuring inaccuracies.

EP 0 604 380 A1 proposes a coordinate measuring machine wherein the workpiece table is supported on a baseplate via at least three feet. The baseplate also has at least three feet, with one foot of the baseplate being arranged below one foot of the workpiece table in each case.

U.S. Pat. No. 4,594,791 discloses a coordinate measuring machine of a portal design wherein the workpiece table is supported on a baseplate via feet. The portal is intended to embrace the workpiece table in an annular structure in order to achieve greater stiffness.

U.S. Pat. Nos. 4,727,653 and 4,495,703 each disclose coordinate measuring machines wherein the guides for the frame structure that bears the measuring head are arranged at the same basic body on which the measurement object is also placed. This basic body can be produced from stone. In order to achieve sufficient stiffness, very heavy basic bodies are required in the case of such a design. Nevertheless, there is a risk here of deformation under the weight of a heavy measurement object.

DE 1 798 191 A1 discloses a coordinate measuring machine having a workpiece table that can be adjusted in height. Tooth racks are provided for locking the workpiece table in a desired baseplate position. This design serves the purpose of measuring objects with sizes that deviate greatly from one another with limited travels of the measuring head.

SUMMARY OF THE INVENTION

Against this background, it is an object of the present invention to provide a simple and cost-effective machine design for reducing the influence of a workpiece weight on the positioning and measuring accuracy.

According to one aspect, this object is achieved by a coordinate measuring machine for determining a measureable variable on a measurement object, the coordinate measuring machine comprising a plurality of machine feet, a baseplate moveably mounted on the plurality of machine feet in such a way that it can be adjusted in a vertical direction between a first and a second baseplate position, a head moveable relative to the baseplate, and a workpiece table designed to be placed over the baseplate in order to support the measurement object, wherein the machine feet project upward from the baseplate in the first baseplate position in order to support the workpiece table, and wherein the machine feet are recessed in the baseplate in the second baseplate position.

According to another aspect, this object is achieved by a device for determining a measureable variable on a workpiece, the device comprising a plurality of machine feet, a baseplate mounted on the plurality of machine feet, a frame structure moveably supported on the baseplate, a head arranged on the frame structure, and a workpiece table designed to be arranged above the baseplate in order to support the workpiece, wherein the machine feet project through and upward from the baseplate in order to support the workpiece table.

According to yet another aspect, there is provided a device for determining a measureable variable on a measurement object, comprising a baseplate mounted on a plurality of machine feet, comprising a head which can be moved relative to the baseplate, and comprising a workpiece table designed to be placed over the baseplate in order to support the measurement object, wherein the baseplate is mounted on the machine feet such that it can be adjusted in a vertical direction, with the machine feet projecting upward from the baseplate in a first baseplate position in order to support the workpiece table, and with the machine feet being recessed in the baseplate in a second baseplate position.

In contrast to other approaches, embodiments of the invention comprise a height-adjustable baseplate that can be optionally set such that the machine feet project upward from the baseplate. In this adjustable position, the workpiece table can be easily placed on the machine feet. The weight of a measurement object lying on the workpiece table is directly absorbed via the machine feet. The baseplate lying below the workpiece table is excluded from the force flux. Possible deformations of the workpiece table do not act on the baseplate. Consequently, the guides of the frame structure that bears the measuring head are decoupled from the weight of the measurement object even when these guides are mounted at or on the baseplate.

On the other hand, the baseplate itself is mounted on the machine feet such that only a small number of machine feet need to be mounted and adjusted. The novel machine or device can therefore be implemented easily and cost effectively.

Moreover, preferred embodiments of the novel machine are very flexible, since they enable easy exchange and use of different workpiece tables. In an elevated baseplate position, the entire baseplate is available for depositing a measurement object. In particular, lightweight measurement objects can be placed directly on the baseplate, while measurement objects of higher weight are put on a workpiece table in order to decouple the guides of the frame structure from the workpiece weight. The novel device can therefore easily be adapted to different measurement tasks, which not only offers the user greater flexibility, but also provides the manufacturer with the possibility of a uniform machine design for a plurality of machines.

In a refinement of the invention, the machine or device includes a plurality of first support elements for mounting the baseplate on the machine feet, and a plurality of second support elements for mounting the workpiece table on the machine feet in the first baseplate position.

In this refinement, the baseplate and the workpiece table are mounted on the machine feet with mutually separated bearings. This enables an even better decoupling of the baseplate from potential deformations of the workpiece table as a consequence of a heavy measurement object.

In a further refinement, the first support elements include a mechanical clamping member designed to lock the baseplate in at least one of the baseplate positions. Preferably, the baseplate can be locked in each baseplate position by means of the mechanical clamping member.

Such a mechanical clamping member can be implemented, for example, by means of clamping jaws or a push rod operated by electric motor, hydraulically, pneumatically or by hand. As an alternative, it is generally conceivable to hold a moveable baseplate in the desired baseplate position solely via the adjusting mechanism itself. The preferred refinement with an additional mechanical clamping member, however, contributes to a further reduction of measuring errors.

In a further refinement, the first support elements include at least one nut that is connected to the baseplate, and at least one threaded rod on which the nut runs.

In other words, the first support elements thereby include a thread drive by means of which the baseplate can be adjusted in the vertical direction. This refinement enables a very cost-effective and robust implementation in which the baseplate can be positioned very accurately.

In a further refinement, the at least one threaded rod forms one of the machine feet. In a preferred exemplary embodiment, all the machine feet are designed as a threaded rod, and the baseplate is mounted on the outer lateral surface of the machine feet via adjusting nuts.

In this refinement, the adjusting mechanism for adjusting the baseplate, and the bearing of the baseplate are combined in a threaded drive. This refinement therefore enables a particularly simple, robust and cost effective implementation of the novel device.

In a further refinement, the second support elements include at least one ball socket bearing for the workpiece table.

Such a bearing holds the workpiece table without stress even when the latter is deformed under the weight of a measurement object. The stress-free bearing contributes to an optimum decoupling of the workpiece table from the guides of the frame structure. Consequently, this refinement is particularly advantageous with regard to the measuring accuracy.

In a further refinement, at least one machine foot has an upper free end that is designed in the shape of a spherical segment.

In this embodiment, the machine foot forms the spherical body that complements the ball socket bearing together with a socket on the workpiece table. As an alternative, the spherical body could also be formed on the workpiece table and, for example, engage in a conical socket that is formed on the upper free end of the at least one machine foot. By contrast, the preferred refinement is more flexible, because the optimization of the bearing can be performed solely by appropriate adaptation of the workpiece table, which can be more easily exchanged than the machine feet or the bearing parts arranged on the end of the machine feet.

In a further refinement, at least one machine foot has a lower free end that is part of a ball socket bearing. It is preferred that all the machine feet are supported on a foundation via ball socket bearings.

This refinement enables an optimum stress free adjustment of the baseplate, and therefore contributes advantageously to a further increase in measuring accuracy.

In a further refinement, the device includes a frame structure on which the measuring head is arranged, the frame structure being mounted such that it can be moved on the baseplate.

In this refinement, the machine feet bear virtually the entire device including the frame structure for the measuring head. The novel decoupling of baseplate and workpiece table has a particularly advantageous effect in this refinement. Moreover, this refinement enables an accurate alignment of the device at the installation site with low outlay.

It goes without saying that the previously mentioned features, and those still to be explained below, can be used not only in the respectively specified combination, but also in other combinations or on their own, without departing from the scope of the present invention.

BRIEF DESCRIPTION OF THE DRAWINGS

Exemplary embodiments of the invention are illustrated in the drawing and explained in more detail in the following description. In the drawing.

DESCRIPTION OF PREFERRED EMBODIMENTS

Figure 1:
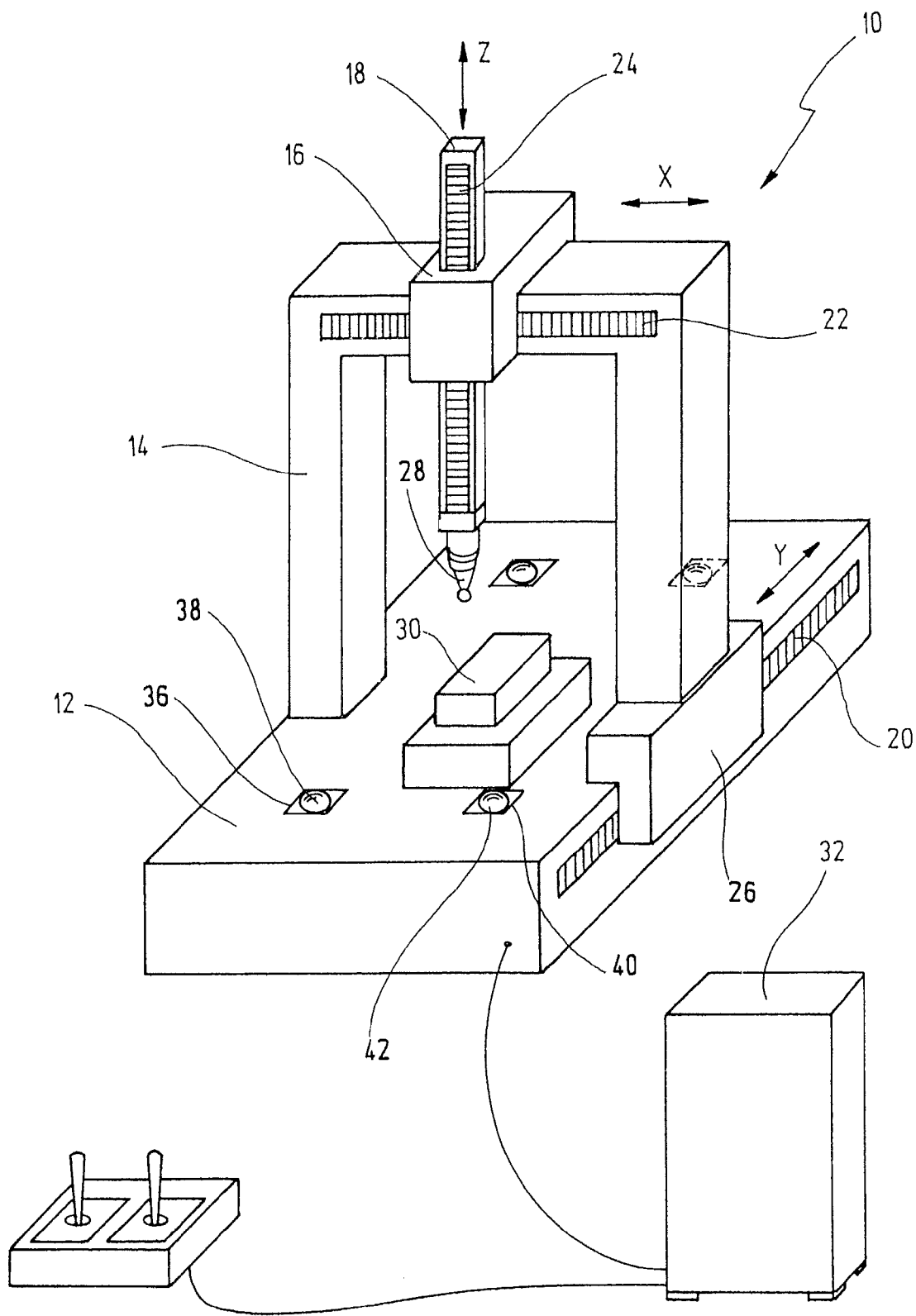
FIG. 1 shows a schematic of a coordinate measuring machine in accordance with the present invention.

In FIG. 1, reference numeral 10 denotes a coordinate measuring machine that is designed in accordance with embodiments of the present invention. However, it should be understood that the invention is not limited to coordinate measuring machines in a narrow sense, but also encompasses other devices where a measuring or working head is moved relative to a baseplate. For the sake of simplicity, the invention is explained by way of the preferred example of a coordinate measuring machine.

The coordinate measuring machine 10 is illustrated here in a portal design, which is a preferred exemplary embodiment of the invention. However, the invention is again not limited to this frame structure, and can also be used with devices of column design and with other frame structures.

The coordinate measuring machine 10 has a baseplate 12 on which a portal 14 is movably arranged. The movement direction of the portal 14 is usually denoted as the Y-axis. Mounted on the cross-member of the portal 14 is a slide 16 that can be moved in the X-direction. The slide 16 bears a quill 18 that can be moved in the Z-direction. Noted by the reference numerals 20, 22 and 24 are measuring scales that are illustrated in a simplified fashion and by means of which the position of a measuring head 28 at the lower free end of the quill 18 can be determined. Illustrated schematically in the case of the reference numeral 26 is a drive that is mounted on a guide 27 (FIG. 2) that runs in the Y-direction.

Denoted by reference numeral 30 is a measurement object that is illustrated in a simplified fashion and whose spatial coordinates and/or geometric dimensions are to be determined by means of the coordinate measuring machine 10. To this end, the measuring head 28 is brought into a defined position with reference to a measuring point on the measurement object 30, and the spatial coordinates of the measuring point are determined by means of the measuring scales 20 to 24. Typically, a feeler arranged on the measuring head 28 is used to make contact with the measuring point on the measurement object 30. However, the invention can also be used with coordinate measuring machines in which a measuring point on the measurement object 30 is approached in a contactless fashion.

Reference numeral 32 denotes an evaluation and control unit that both controls the movements of the coordinate measuring machine 10 and determines the spatial coordinates and/or geometric dimensions of the measurement object 30 here.

Reference numeral 36 denotes a first cutout in the baseplate 12 in which a first machine foot 38 is arranged. Illustrated at reference numeral 40 is a further cutout, in which a further machine foot 42 is arranged. The machine feet 38, 42 are connected to the baseplate 12 in a way explained below.

Figure 2:
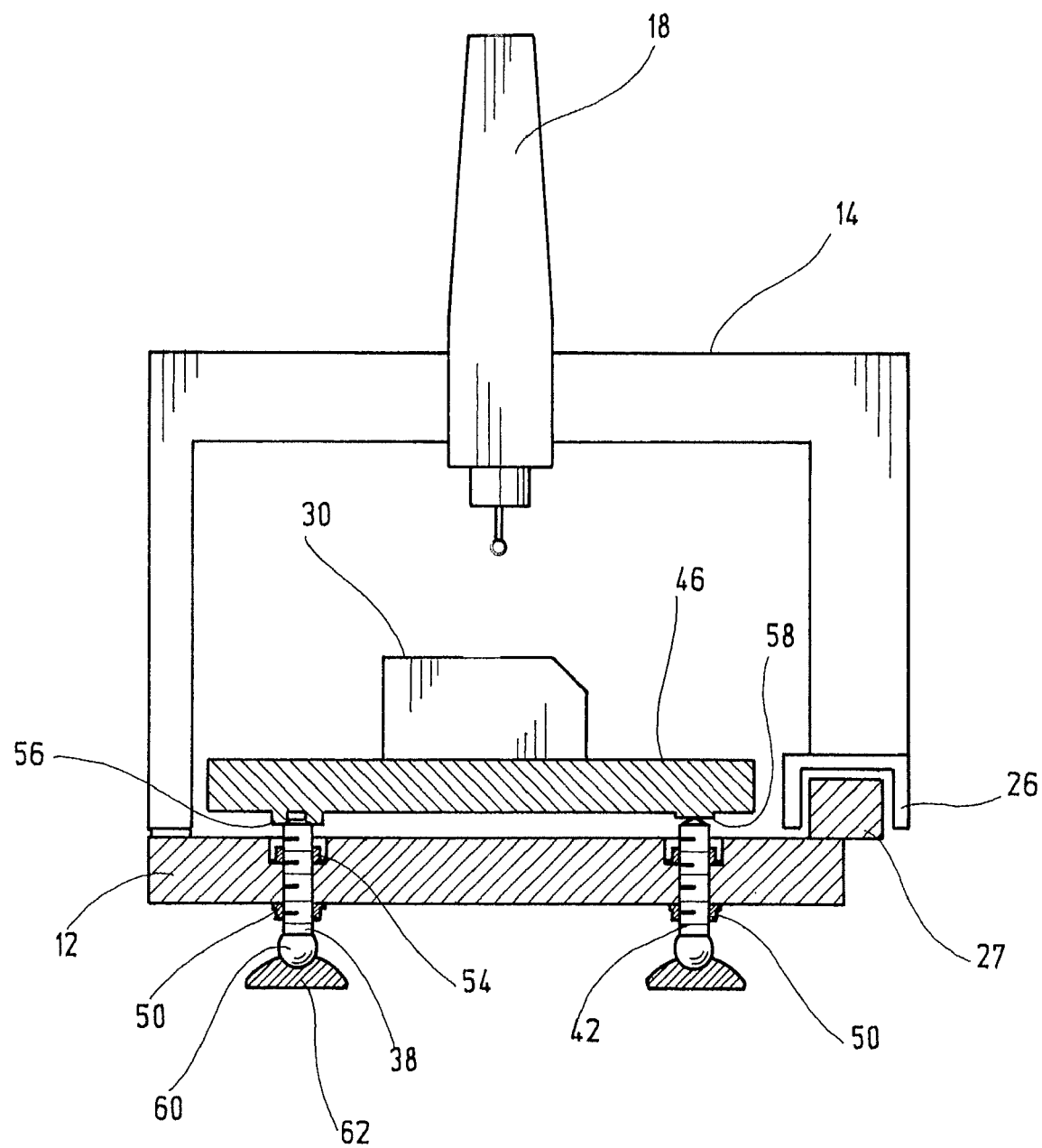
FIG. 2 shows a partially sectioned side view of a coordinate measuring machine of the type shown in FIG. 1, and FIG. 3 the coordinate measuring machine from FIG. 2 in a measuring mode without a workpiece table.
Figure 3:
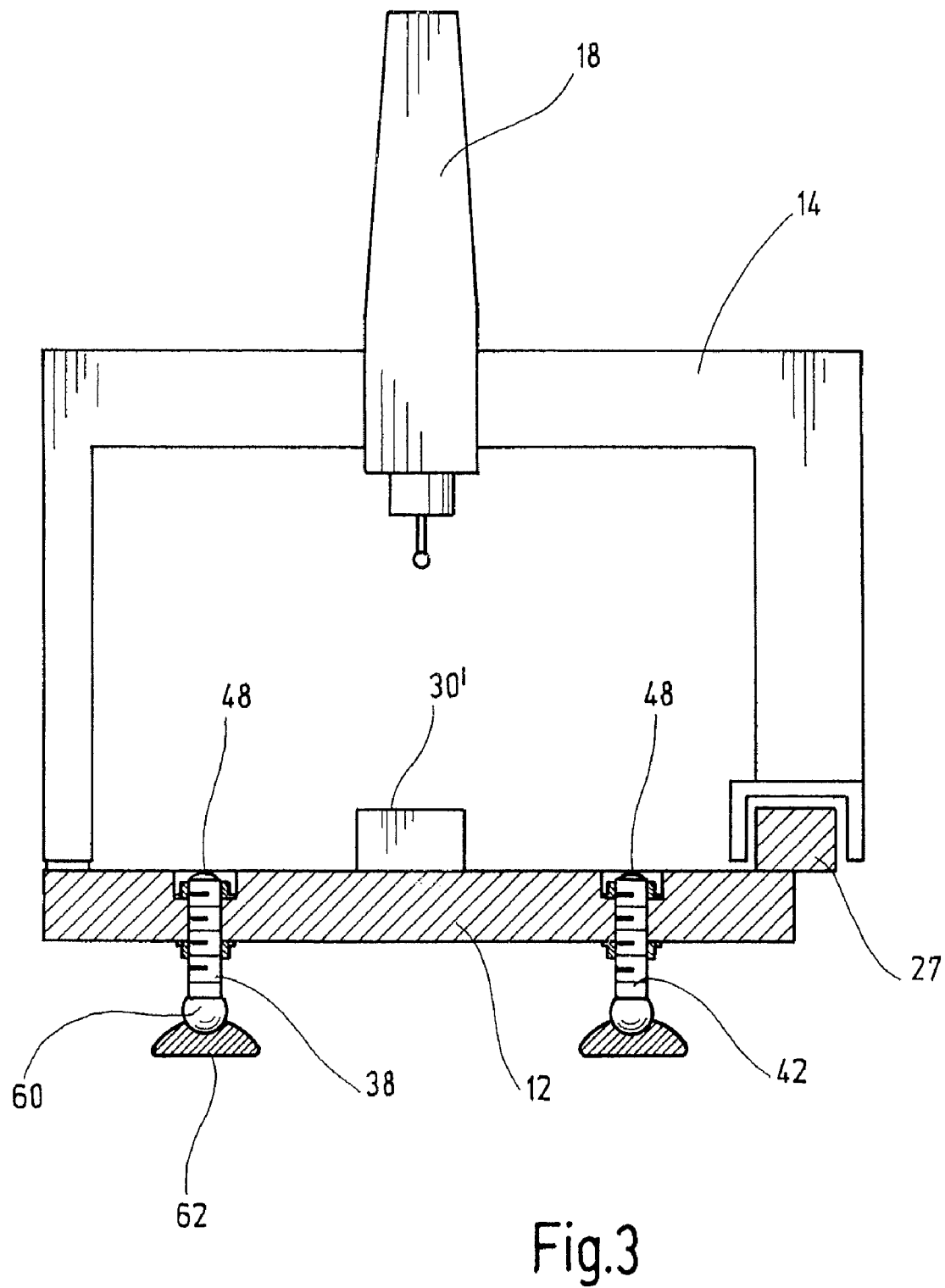

FIGS. 2 and 3 show the design of the coordinate measuring machine 10 in two different operating modes. Identical reference numerals denote the same elements as before.

In FIG. 2, the measurement object 30 may be assumed to be a heavy measurement object. It is mounted on a workpiece table 46 that rests on the upper free ends 48 of the machine feet 38, 40. In FIG. 3, an assumed lightweight measurement object 30' is mounted directly on the baseplate 12 (without workpiece table), as is also illustrated in FIG. 1.

In order to use the coordinate measuring machine 10 without the workpiece table 46, the baseplate 12 is adjustably mounted on the machine feet 38, 42. In accordance with a preferred exemplary embodiment, the machine feet 38, 42 are designed here as threaded rods, each rod running in a nut 50. The nuts 50 are arranged on the underside of the baseplate 12. The threaded rods 38, 42 can be rotated about their longitudinal axis via a drive that is not illustrated here, as a result of which the baseplate 12 can be brought into a first, lower baseplate position (FIG. 2) or a second, upper baseplate position (FIG. 3).

In the first, lower baseplate position, the upper free ends 48 of the machine feet 38, 40 project over the baseplate 12. Consequently, the workpiece table 46 can easily be placed on the upper free ends of the machine feet 38, 42. In the second, upper baseplate position, the free ends of the machine feet 48 are recessed in the cutouts 36, 40. This enables very large workpieces 30' to be measured to the extent that the latter are light enough so that a deformation of the baseplate 12 as a consequence of the weight of the measurement object can be neglected.

In the exemplary embodiment illustrated, there is arranged in each cutout 36, 40 a set of clamping jaws 54 by means of which the baseplate 12 can be locked at the machine feet 38, 42 in the selected baseplate position. The clamping jaws 54 can be actuated by electric motor, hydraulically, pneumatically or else by hand.

The upper free ends 48 of the machine feet 38, 42 are designed here approximately in the shape of a hemisphere. They form a bearing part of a ball socket bearing for the workpiece table 46. In a preferred exemplary embodiment, the workpiece table 46 has upon its underside bearing sockets for holding the free ends 48 of the machine feet 38, 42, a first bearing socket 56 being designed as ball socket or conical socket, while a second bearing socket 58 has a largely planar supporting surface. The use of different bearing sockets 56, 58 is advantageous in order to achieve a stress-free bearing of the workpiece table 46 on the machine feet 38, 42.

The lower free ends 60 of the machine feet 38, 42 are likewise designed here in the shape of a sphere, and they respectively rest in a corresponding ball socket 62 that is part of a foundation (not otherwise illustrated in more detail). As an alternative to this preferred refinement, the machine feet 38, 42 can, however, stand flat on a foundation or be integrated into a foundation.

The placing of a measurement object 30 on the workpiece table 46 leads in the case of the coordinate measuring device 10 to the fact that the guide 27 and the remaining frame structure 14, 16, 18 are decoupled from the measurement object 30. A deformation of the workpiece table 46 as a result of the weight of the measurement object 30 has no influence on the frame structure, particularly when the workpiece table 46 is mounted free from stress on the machine feet 38, 42, as indicated in FIG. 2. On the other hand, the coordinate measuring machine 10 can, however, be used without workpiece table 46, as illustrated in FIG. 3.

What is claimed is:

1. A coordinate measuring machine for determining a measureable variable on a measurement object, the coordinate measuring machine comprising:
    a plurality of machine feet,
    a baseplate moveably mounted on the plurality of machine feet in such a way that it can be adjusted in a vertical direction between a first and a second baseplate position,
    a machine head moveable relative to the baseplate, and
    a workpiece table designed to be placed over the baseplate in order to support the measurement object,
    wherein the machine feet extend upward from beneath the baseplate and through the baseplate such that in the first baseplate position an upper portion of the machine feet project above the baseplate in order to support the workpiece table, and
    wherein the upper portion of the machine feet are recessed in the baseplate in the second baseplate position.

2. The machine of claim 1, further comprising a plurality of first support elements for mounting the baseplate on the machine feet, and a plurality of second support elements for mounting the workpiece table on the machine feet in the first baseplate position.

3. The machine of claim 2, wherein the first support elements comprise a mechanical clamping member designed to lock the baseplate in at least one of the baseplate positions.

4. The machine of claim 2, wherein the first support elements comprise at least one nut that is fastened on the baseplate, and at least one threaded rod on which the nut runs.

5. The machine of claim 4, wherein the at least one threaded rod forms one of the machine feet.

6. The machine of claim 2, wherein the second support elements include at least one ball socket bearing for the workpiece table.

7. The machine of claim 6, wherein at least one machine foot has an upper free end that is designed in the shape of a spherical segment.

8. The machine of claim 1, wherein at least one machine foot has a lower end that is part of a ball socket bearing.

9. The machine of claim 1, further comprising a frame structure on which the head is arranged, the frame structure being moveably supported on the baseplate.

10. A device for determining a measureable variable on a workpiece, the device comprising:
a plurality of machine feet,
a baseplate mounted on the plurality of machine feet,
a frame structure moveably supported on the baseplate,
a head arranged on the frame structure, and
a workpiece table designed to be arranged above the baseplate in order to support the workpiece,
wherein the machine feet extend from below the baseplate upward above the baseplate in order to support the workpiece table.

11. The device of claim 10, wherein the baseplate is moveably mounted on the machine feet in a vertical direction between a lower first position and an upper second position, with the machine feet projecting through and upward from the base plate in the lower first position, and with the machine feet being recessed in the baseplate in the upper second position; and further wherein the workpiece table is arranged above the baseplate and supported solely by the machine feet when the baseplate is in the first lower position.

12. The device of claim 11, further comprising a plurality of first support elements for mounting the baseplate on the machine feet, and a plurality of second support elements for mounting the workpiece table on the machine feet.

13. The device of claim 12, wherein the first support elements include a mechanical clamping member designed to lock the baseplate in at least one of the first and second positions.

14. The device of claim 12, wherein the first support elements include at least one nut that is fastened on the baseplate, and at least one threaded rod on which the nut runs.

15. The device of claim 14, wherein the at least one threaded rod forms one of the machine feet.

16. The device of claim 12, wherein the second support elements include at least one ball socket bearing for the workpiece table.

17. The device of claim 16, wherein at least one machine foot has an upper free end that is designed in the shape of a spherical segment.

18. The device of claim 10, wherein at least one machine foot has a lower end that is part of a ball socket bearing.

19. A device for determining a measureable variable on a measurement object, comprising a baseplate mounted on a plurality of machine feet, comprising a head which can be moved relative to the baseplate, and comprising a workpiece table designed to be placed over the baseplate in order to support the measurement object, wherein the baseplate is mounted on the machine feet such that it can be adjusted in a vertical direction, with the machine feet extending from beneath the baseplate and projecting through and upward from the baseplate in a first baseplate position so that the workpiece table is supported solely by the machine feet, and with the machine feet being recessed in the baseplate in a second baseplate position.

20. The device of claim 19, further comprising a frame structure holding the head, with the frame structure being moveably supported on the baseplate.

* * * * *